United States Patent
Koh

[11] Patent Number: 6,035,184
[45] Date of Patent: Mar. 7, 2000

[54] SIGNAL PROCESSING CIRCUIT

[75] Inventor: Nozomi Koh, Kanagawa, Japan

[73] Assignee: Matsushita Electric Industrial Co., Ltd., Osaka, Japan

[21] Appl. No.: 08/879,959

[22] Filed: Jun. 20, 1997

[30] Foreign Application Priority Data

Jun. 25, 1996 [JP] Japan .................................. 8-164588

[51] Int. Cl.[7] ............................................. H04L 7/00
[52] U.S. Cl. ......................... 455/255; 455/84; 455/310; 455/317
[58] Field of Search ............................. 455/75, 76, 84, 455/114, 255, 307, 310, 317; 375/346, 354

[56] References Cited

U.S. PATENT DOCUMENTS

| | | |
|---|---|---|
| 4,569,072 | 2/1986 | Van Roermund ........................ 455/307 |
| 4,905,305 | 2/1990 | Garner et al. ........................... 455/317 |
| 5,263,055 | 11/1993 | Cahill ...................................... 455/317 |
| 5,519,890 | 5/1996 | Pinckley .................................. 455/307 |
| 5,542,113 | 7/1996 | Fink et al. ................................. 455/75 |
| 5,697,082 | 12/1997 | Greer et al. ............................. 455/255 |
| 5,781,849 | 7/1998 | Carlsson et al. ........................ 455/114 |
| 5,812,940 | 9/1998 | Lindell .................................... 455/317 |

*Primary Examiner*—Dwayne D. Bost
*Assistant Examiner*—Nay Maung
*Attorney, Agent, or Firm*—Pearne, Gordon, McCoy & Granger LLP

[57] ABSTRACT

A signal processing circuit for use in a mobile radio equipment terminal including a receiver is provided with an oscillator for oscillating a clock signal serving as a reference; a harmonic-component reducing circuit for restricting a level of harmonic components of the clock signal; and a CPU core portion for effecting signal processing by using the clock signal as a reference.

6 Claims, 1 Drawing Sheet

SIGNAL PROCESSING CIRCUIT

BACKGROUND OF THE INVENTION

The present invention relates to a signal processing circuit for use in a mobile radio equipment terminal such as a pager, a cellular phone, or the like.

FIG. 3 is a block diagram illustrating a configuration of a CPU which is mounted in a signal processing circuit used in a conventional mobile radio equipment terminal. In the drawing, reference numeral 1 denotes an oscillator; 2, a waveform shaper constituted by a gain buffer or the like; 4, a CPU core portion; 5, a program ROM; 6, a RAM; and 7, an I/O buffer. In terms of its operation, first, after the waveform of a clock signal oscillated by the oscillator 1 is shaped by the waveform shaper 2, the clock signal is applied to the CPU core portion 4. Then, by using this clock signal as a reference clock, the CPU core portion 4 accesses the RAM 6 and the I/O buffer 7 in accordance with the contents of the program ROM 5, and effects desired signal processing.

With recent signal processing circuits, however, there has been a growing demand for high-speed signal processing and a compact circuit. In conjunction with this demand, in the conventional signal processing circuits as well, the circuits are designed in such a way that stray capacities of signal circuits, such as the waveform shaper 2, the CPU core portion 4, the program ROM 5, the RAM 6, and the like, are minimized. Consequently, the radiation of the electromagnetic wave may occur in the signal processing circuit. In addition, since this signal processing circuit is naturally used in combination with a receiver attached to the mobile radio equipment terminal, the signal processing circuit and the receiver are disposed in proximity to each other. Hence, there has been a problem in that the radiation constitutes noise components and deteriorate the signal-to-noise (S/N) ratio of the receiver, thereby appreciably degrading the reception performance.

SUMMARY OF THE INVENTION

Accordingly, it is an object of the present invention to provide a signal processing circuit which does not degrade the reception performance of a mobile radio equipment terminal including a receiver, thereby overcoming the above-described drawback of the conventional art.

To this end, in accordance with a first aspect of the present invention, there is provided a signal processing circuit for use in a mobile radio equipment terminal including a receiver, comprising: an oscillator for oscillating a clock signal serving as a reference; a harmonic-component reducing circuit for restricting a level of harmonic components of the clock signal; and a CPU core portion for effecting signal processing by using the clock signal as a reference.

In accordance with a second aspect of the present invention, there is provided a signal processing circuit for use in a mobile radio equipment terminal including a receiver, comprising: a CPU; a decoder; and a display driver, wherein harmonic-component reducing circuits are respectively provided in the CPU, the decoder, and the display driver.

It is discovered that the radiation is caused by the power spectrum of harmonic components of signals which pass through the signal processing circuits during operation which is extended up to very high frequencies, and their frequency band reaches even the reception frequency band of the mobile radio equipment terminal. According to the present invention, since the power spectrum of harmonic components is not generated in the signal processing circuit, its radiation does not occur, so that it is possible to obtain a signal processing circuit which does not degrade the reception performance of the mobile radio equipment terminal including a receiver.

The above and other objects, features and advantages of the present invention will become more apparent from the following detailed description of the invention when read in conjunction with the accompanying drawings.

DESCRIPTION OF THE PREFERRED EMBODIMENTS

Figure 1:
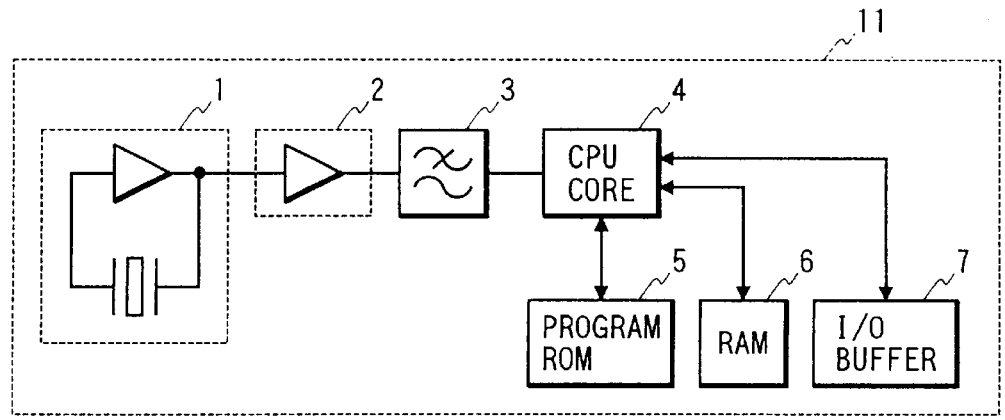
FIG. 1 is a block diagram illustrating a configuration of a CPU portion which is mounted in a signal processing circuit in accordance with a first embodiment of the present invention.

Referring now to the accompanying drawings, a description will be given of the embodiments of the present invention. It should be noted that those portions which are identical to those of the conventional example are denoted by the same reference numerals.

First Embodiment

FIG. 1 is a block diagram illustrating a configuration of a CPU portion which is mounted in a signal processing circuit in accordance with a first embodiment of the present invention. In the drawing, reference numeral 1 denotes an oscillator; 2, a waveform shaper; 4, a CPU core portion; 5, a program ROM; 6, a RAM; and 7, an I/O buffer. The above configuration is identical to that of the conventional example described before. In the present invention, a harmonic-component reducing circuit 3 is added to this conventional configuration, and together with the other components constitutes a CPU 11 as a whole. Hereafter, a description will be given of the operation in accordance with this embodiment.

First, after the waveform of a clock signal oscillated by the oscillator 1 is shaped by the waveform shaper 2, the level of the harmonic components is restricted by the harmonic-component reducing circuit 3. In this case, the cutoff frequency of the harmonic-component reducing circuit 3 is set to be sufficiently higher than the frequency of the clock signal to maintain an operating margin, and is set to be sufficiently lower than the reception frequency band of the mobile radio equipment terminal including the receiver. Further, by increasing the number of stages of filters, the attenuation of the harmonic components is ensured. By using this clock signal with a lowered harmonic component level as a reference, the CPU core portion 4 accesses the RAM 6 and the I/O buffer 7 in accordance with the contents of the program ROM 5, and effects desired signal processing. If such a configuration is provided, the circuits are designed in such a way that stray capacities of signal circuits, such as the waveform shaper 2, the CPU core portion 4, the program ROM 5, the RAM 6, and the like, are minimized. Hence, even if the gain of the signal circuits during operation is maintained even up to very high frequencies, since the level of the harmonic components of the clock signal is restricted by the aforementioned harmonic-component reducing circuit 3, no adverse effect is exerted on the reception performance of the mobile radio equipment terminal including the receiver. Incidentally, if the harmonic-component reducing circuit 3 is incorporated in the waveform shaper 2 or the CPU core portion 4, a similar effect can be obtained.

Second Embodiment

Figure 2:
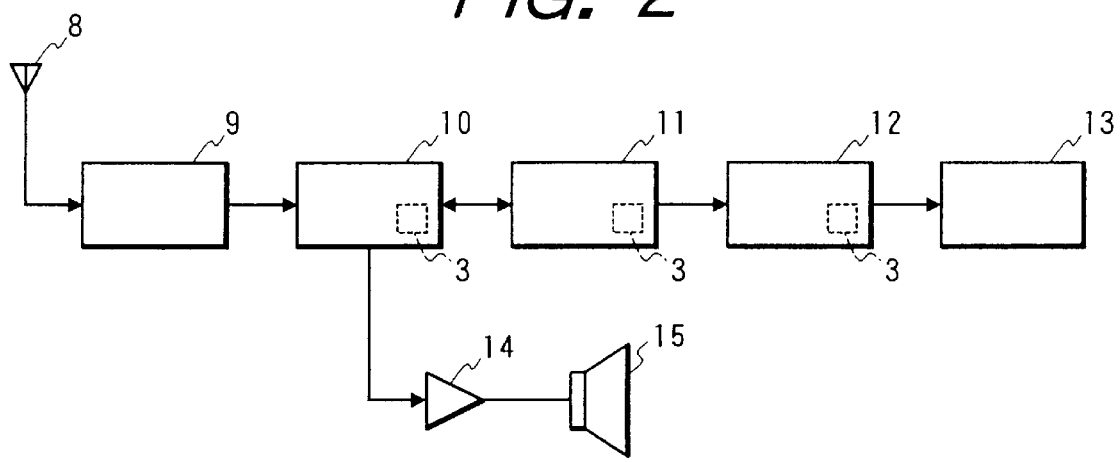
FIG. 2 is a block diagram illustrating a configuration of a pager terminal using the signal processing circuit in accordance with a second embodiment of the present invention.
Figure 3:
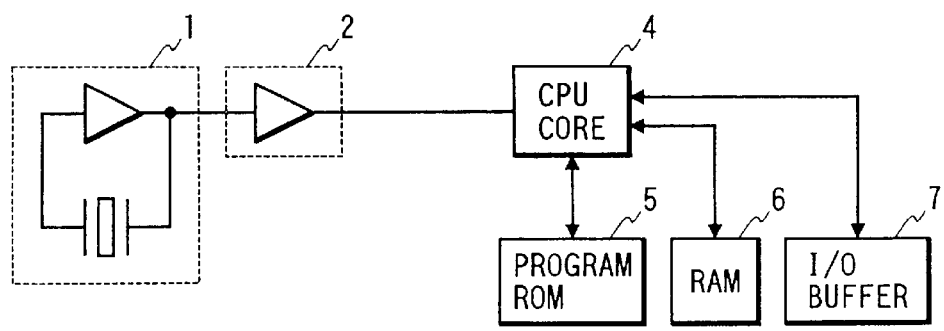
FIG. 3 is a block diagram illustrating a configuration of a CPU which is mounted in a conventional signal processing circuit.

FIG. 2 is a block diagram illustrating a configuration of a pager terminal using the signal processing circuit in accordance with a second embodiment of the present invention. In the drawing, reference numeral 8 denotes an antenna; 9, a receiving circuit; 10, a decoder; 11, the CPU; 12, a liquid-crystal display driver; 13, a liquid-crystal display; 14, a sounding-body driving amplifier; and 15, a sounding body such as a speaker, wherein the decoder 10, the CPU 11, and the liquid-crystal display driver 12 constitute a signal processing circuit. In this configuration, as described in the first embodiment, it is estimated that the harmonics of the clock signal of the CPU 11 are inputted from the antenna 8 as noise components, thereby exerting an adverse effect on the receiving circuit 9, and yet the harmonics of the driving waveforms of the decoder 10 and the liquid-crystal display driver 12 also present similar problems. In this embodiment, in view of this aspect, the CPU 11 incorporates the harmonic-component reducing circuit 3 as described above, and the decoder 10 and the liquid-crystal display driver 12 also incorporate the harmonic-component reducing circuits 3 at portions where the harmonics are generated. As a result, the level of the harmonic components is restricted, so that no adverse effect is exerted on the receiving circuit 9.

In accordance with the above-described embodiments, the harmonic noise is restricted in the signal processing circuit, and unwanted radiation is suppressed, so that it is possible to obtain a signal processing circuit which does not degrade the reception performance of a mobile radio equipment terminal including a receiver.

As described above, in accordance with the present invention, since the harmonic-component reducing circuit for restricting harmonic noise is provided in the signal processing circuit, it is possible to suppress unwanted radiation. Hence, it is possible to obtain an advantageous effect as a signal processing circuit in that when the signal processing circuit is used in combination with a mobile radio equipment terminal including a receiver, it is possible to constantly maintain a favorable state of reception without exerting an adverse effect on the reception performance.

What is claimed is:

1. A signal processing circuit for use in a mobile radio equipment terminal including a receiver, comprising:

an oscillator for generating a clock signal and outputting said clock signal;

a harmonic-component reducing circuit that receives said clock signal and is operable to restrict a level of harmonic components of said clock signal, said harmonic-component reducing circuit outputting a modified clock signal having a lowered harmonic component level as compared to said clock signal; and a central processing unit (CPU) core portion for effecting signal processing by using said modified clock signal as a reference signal.

2. A signal processing circuit according to claim 1, wherein said harmonic-component reducing circuit is provided in said CPU core portion.

3. A signal processing circuit according to claim 1, wherein said harmonic-component reducing circuit has a cut off frequency that is sufficiently higher than a frequency of said clock signal and sufficiently lower than a reception frequency band of the mobile radio equipment terminal.

4. A signal processing circuit for use in a mobile radio equipment terminal including a receiver, comprising a central processing unit (CPU); a decoder; and a display driver;

wherein at least one of said CPU, said decoder, and said display driver includes a harmonic-component reducing circuit for receiving a processing signal, restricting a level of harmonic components of said processing signal, and generating a modified processing signal having a lowered harmonic component level as compared to said processing signal.

5. A signal processing circuit according to claim 4, wherein each of said CPU, said decoder, and said display driver includes a harmonic-component reducing circuit for restricting a level of harmonic components of said processing signal.

6. A signal processing circuit according to claim 4, wherein said CPU includes means for generating a clock signal that is supplied to said harmonic-component reducing circuit, said harmonic component reducing circuit outputting a modified clock signal, said harmonic-component reducing circuit having a cut off frequency, said cut-off frequency being sufficiently higher than a frequency of said clock signal, and being sufficiently lower than a reception frequency band of the mobile radio equipment terminal.

* * * * *